(12) United States Patent
Higashinaka

(10) Patent No.: US 7,609,788 B2
(45) Date of Patent: Oct. 27, 2009

(54) RECEIVER APPARATUS USING MAXIMUM-LIKELIHOOD-DETERMINATION

(75) Inventor: Masatsugu Higashinaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 567 days.

(21) Appl. No.: 10/586,366

(22) PCT Filed: Dec. 15, 2004

(86) PCT No.: PCT/JP2004/018713

§ 371 (c)(1),
(2), (4) Date: Jul. 18, 2006

(87) PCT Pub. No.: WO2005/081411

PCT Pub. Date: Sep. 1, 2005

(65) Prior Publication Data

US 2007/0160171 A1    Jul. 12, 2007

(30) Foreign Application Priority Data

Feb. 25, 2004    (JP) .............................. 2004-049836

(51) Int. Cl.
H04L 27/06    (2006.01)
(52) U.S. Cl. ..................... 375/341; 375/316; 375/347; 455/101
(58) Field of Classification Search ............... 375/341, 375/316, 347; 455/101
See application file for complete search history.

(56) References Cited

U.S. PATENT DOCUMENTS

| | | | |
|---|---|---|---|
| 6,600,796 B1* | 7/2003 | Hassibi ....................... | 375/347 |
| 6,658,234 B1* | 12/2003 | Dogan et al. ................ | 455/63.1 |
| 6,675,187 B1* | 1/2004 | Greenberger ............... | 708/622 |
| 6,831,944 B1* | 12/2004 | Misra et al. .................. | 375/147 |
| 7,035,354 B2* | 4/2006 | Karnin et al. ................ | 375/341 |
| 7,110,349 B2* | 9/2006 | Branlund et al. ............ | 370/203 |
| 7,218,906 B2* | 5/2007 | Sayeed et al. ............... | 455/295 |
| 7,317,770 B2* | 1/2008 | Wang .......................... | 375/340 |

(Continued)

FOREIGN PATENT DOCUMENTS

JP    2001-196982    7/2001

(Continued)

OTHER PUBLICATIONS

Damen, "On maximum-likelihood detection and the search for the closest lattice point," IEEE Transaction on Information Theory, vol. 49, pp. 2389-2402, Oct. 2003.*

(Continued)

*Primary Examiner*—Juan A Torres
(74) *Attorney, Agent, or Firm*—Oblon, Spivak, McClelland, Maier & Neustadt, L.L.P.

(57) ABSTRACT

A metric calculating unit calculates a metric based on a provisional determination of a transmission signal and a reception signal. A lattice-point-range setting/estimate-symbol generating unit forms a hypersphere centering around a reception signal point based on the calculated metric or an updated metric, and determines whether a candidate of an estimate symbol is present within the hypersphere. A metric calculating/comparing unit calculates a metric based on the candidate of the estimate symbol and the reception signal, stores a minimum metric and corresponding candidate of the estimate symbol, and updates stored information when a newly calculated metric is minimum.

3 Claims, 5 Drawing Sheets

U.S. PATENT DOCUMENTS

| | | | |
|---|---|---|---|
| 7,352,819 B2* | 4/2008 | Lakshmipathi et al. | 375/260 |
| 7,505,788 B1* | 3/2009 | Narasimhan | 455/562.1 |
| 2002/0126772 A1* | 9/2002 | Brunel | 375/340 |
| 2003/0060903 A1* | 3/2003 | MacMartin et al. | 700/32 |
| 2003/0125040 A1* | 7/2003 | Walton et al. | 455/454 |
| 2003/0185309 A1* | 10/2003 | Pautler et al. | 375/257 |
| 2004/0095907 A1* | 5/2004 | Agee et al. | 370/334 |
| 2004/0192218 A1* | 9/2004 | Oprea | 455/73 |
| 2005/0152484 A1* | 7/2005 | Sandhu et al. | 375/347 |

FOREIGN PATENT DOCUMENTS

| | | |
|---|---|---|
| JP | 2002-217869 | 8/2002 |
| JP | 2003-032226 | 1/2003 |
| JP | 2004-282757 | 10/2004 |

OTHER PUBLICATIONS

Bhouri, "A new QRD-based block adaptive algorithm", Proceedings of the 1998 IEEE International Conference on Acoustics, Speech and Signal Processing, 1998 vol. 3, May 12-15, 1998 pp. 1497-1500 vol. 3.*

Boudreau, "Adaptive equalization of CPM signals transmitted over fast Rayleigh flat-fading channels" IEEE Transactions on Vehicular Technology, vol. 44, Issue 3, Aug. 1995 pp. 404-413.*

Letaief, "Joint maximum likelihood detection and interference cancellation for MIMO/OFDM systems", VTC 2003-Fall. 2003 IEEE 58th Vehicular Technology Conference, 2003, vol. 1, Oct. 6-9, 2003 pp. 612-616 vol. 1.*

Boudreau, "Adaptive equalization of CPM signals in a fast flat-fading environment", Personal Communications: Gateway to the 21st Century. Conference Record., 2nd International Conference on Universal Personal Communications, 1993, vol. 2, Oct. 12-15, 1993 pp. 936-940 vol. 2.*

"Cholesky decomposition",http://en.wikipedia.org/wiki/Cholesky_decomposition, (retrieved on Feb. 18, 2008) pp. 1-6.

Viterbo, Emanuele et al., "A Universal Lattice code Decoder for Fading Channels", IEEE, vol. 45, No. 5, pp. 1639-1642, Jul. 1999.

Furuta, Takayuki et al., "Sphere decoding a frequency selective MIMO channel", The Institute of Electronics, Information and Communication Engineers, vol. 103, No. 253, pp. 7-12, 2003.

* cited by examiner

100 — RECEPTION SIGNAL POINT
LATTICE POINT

RECEIVER APPARATUS USING MAXIMUM-LIKELIHOOD-DETERMINATION

TECHNICAL FIELD

The present invention relates to a receiving apparatus that uses a maximum-likelihood-determination method as a method of determining reception data in digital communications. Particularly, the invention relates to a receiving apparatus that realizes a maximum likelihood determination with a small amount of operation.

BACKGROUND ART

A conventional receiving apparatus is explained. One example of reception data determination methods in digital communications is a maximum-likelihood-determination method. According to this method, a reception apparatus calculates a metric of replica generated from a transmission path response and a transmission symbol candidate and a reception signal, searches a replica that minimizes the metric from among all combinations, and outputs a corresponding transmission symbol candidate as a determination result. This maximum-likelihood-determination method has excellent reception performance. However, since a metric is calculated for all available combinations of replicas, an enormous amount of operation is necessary.

For example, Nonpatent Literature 1 describes about "Sphere Decoding (hereinafter, SD)" as a technique for decreasing the amount of operation in the maximum-likelihood-determination method. According to this technique, hypersphere is set around a reception signal point in a lattice point space formed by all replicas, and a metric is calculated for only replicas that are present inside the hypersphere. According to this technique, replicas that are present at the outside of the hypersphere do not need to be considered. Therefore, the number of times of metric calculations can be decreased from that required by the maximum-likelihood-determination method. An initial value of a hypersphere radius is given in advance based on, for example, dispersion of noise. The radius of the hypersphere is updated by a minimum metric each time when metric is calculated. The determination process ends when the radius becomes small and when no replica is present within the hypersphere along with progress of the process. A candidate of a transmission signal having a minimum metric is output as a determination value. When the SD is adopted, characteristics equivalent to those obtained by the maximum-likelihood-determination method can be obtained with a small amount of operation.

Nonpatent Literature 1: Emanuele Viterbo, Joseph Boutros, "A Universal Lattice Code Decoder for Fading Channels," IEEE Transactions on Information Theory, Vol. 45, No. 5, pp. 1639-1642, July 1999.

DISCLOSURE OF INVENTION

Problems to be Solved by the Invention

However, according to the conventional SD, since the initial value of the hypersphere radius is determined mainly based on the dispersion of noise, a large radius needs to be set in the environment of a small signal-to-noise power ratio in the reception apparatus. As a result, an excessively large hypersphere is set depending on momentary noise power. Consequently, the effect of decreasing the number of times of metric calculations cannot be obtained efficiently.

Further, according to the conventional SD, since the initial value of the hypersphere radius is set based on one standard, the radius cannot be set flexibly according to the communication environment. As a result, it is difficult to constantly obtain a maximum-likelihood-determination value with a small number of times of metric calculations without depending on the communication environment.

The present invention has been achieved in the light of the above problems, and it is an object of the invention to provide a receiving apparatus that can always realize a maximum likelihood determination with a small amount of operation.

Means for Solving Problems

To solve the above problems and to achieve the object, a receiving apparatus according to one aspect of the present invention uses a maximum-likelihood-determination method as a method of determining reception data, and executes a determination process using an analog-to-digital-converted reception signal. The receiving apparatus includes a transmission-path estimating unit that estimates a transmission-path response matrix of a radio transmission path based on the reception signal; a matrix processing unit that decomposes the transmission-path response matrix into an upper triangular matrix, and multiplies the reception signal by an inverse matrix of the transmission-path response matrix; a provisional determining unit that provisionally determines a transmission signal based on a result of multiplication of the reception signal by the inverse matrix of the transmission-path response matrix; a metric calculating unit that calculates a metric based on a result of the provisional determination, the decomposed transmission-path response matrix, and the result of the multiplication; an estimate-symbol determining unit that forms a hypersphere centering around a reception signal point based on either one of the metric obtained as a result of the calculation by the metric calculating unit and an updated metric, generates a candidate of an estimate symbol based on the decomposed transmission-path response matrix and the result of the multiplication, and determines whether the candidate of the estimate symbol is present within the hypersphere; and a metric updating unit that calculates a metric based on the candidate of the estimate symbol obtained as a result of the determination by the estimate-symbol determining unit and the result of the multiplication, stores a minimum metric from among metrics calculated in the past and the candidate of the estimate symbol corresponding to the minimum metric, compares a newly calculated metric with a currently stored metric every time when the metric is newly calculated, and updates stored information when the newly calculated metric is smaller than the currently stored metric. The metric updating unit repeats the update process until the estimate-symbol determining unit determines that no candidate of the estimate symbol is present within the hypersphere, and sets the candidate of the estimate symbol that corresponds to a final minimum metric as a maximum-likelihood-determination value.

According to the present invention, a starting point of a maximum likelihood determination process is determined based on a result of a provisional determination made by a provisional determining unit. Therefore, a metric calculation can be carried out at a lattice point nearer to a maximum likelihood determination symbol.

EFFECT OF THE INVENTION

According to an embodiment of the present invention, the number of times of metric calculation can be decreased.

Therefore, for example, even in the environment of a small signal-to-noise power ratio, the amount of operation can be decreased substantially.

Figure 1:
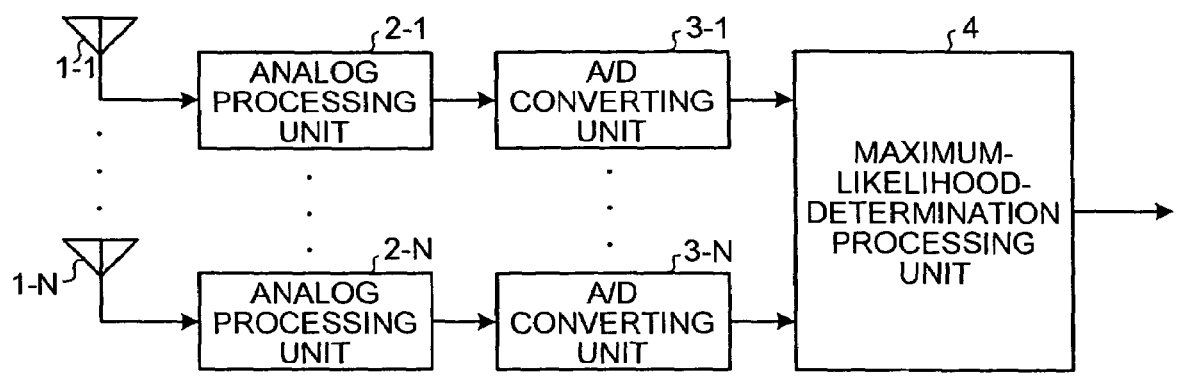
FIG. 1 is an example of a total configuration of a receiving apparatus according to the present invention.

EXPLANATIONS OF LETTERS OR NUMERALS 1-1, 1-N Antenna
2-1, 2-N Analog processing unit
3-1, 3-N A/D converting unit
4 Maximum-likelihood-determination processing unit
11 Pre-processing unit
12 Provisional determining unit
13 Metric calculating unit
14, 41, 54 Lattice-point-range setting/estimate-symbol generating unit
15 Metric calculating/comparing unit
21 Transmission-path estimating unit
22 Matrix processing unit
31 Upper-triangulating processing unit
32 Inverse-matrix operating unit
33 Multiplying unit
42, 53, 55, 62, 63 Selecting unit
51 Comparing unit
52, 61-1, 61-M Radius setting unit

BEST MODE(S) FOR CARRYING OUT THE INVENTION

Exemplary embodiments of a receiving apparatus according to the present invention will be explained in detail with below reference to the accompanying drawings. The present invention is not limited to the embodiments.

First Embodiment

FIG. 1 is an example of a total configuration of a receiving apparatus according to the present invention. This receiving apparatus includes antennas 1-1 to 1-N, analog processing units 2-1 to 2-N, A/D converting units 3-1 to 3-N, and a maximum-likelihood-determination processing unit 4 as the feature of the invention.

Figure 2:
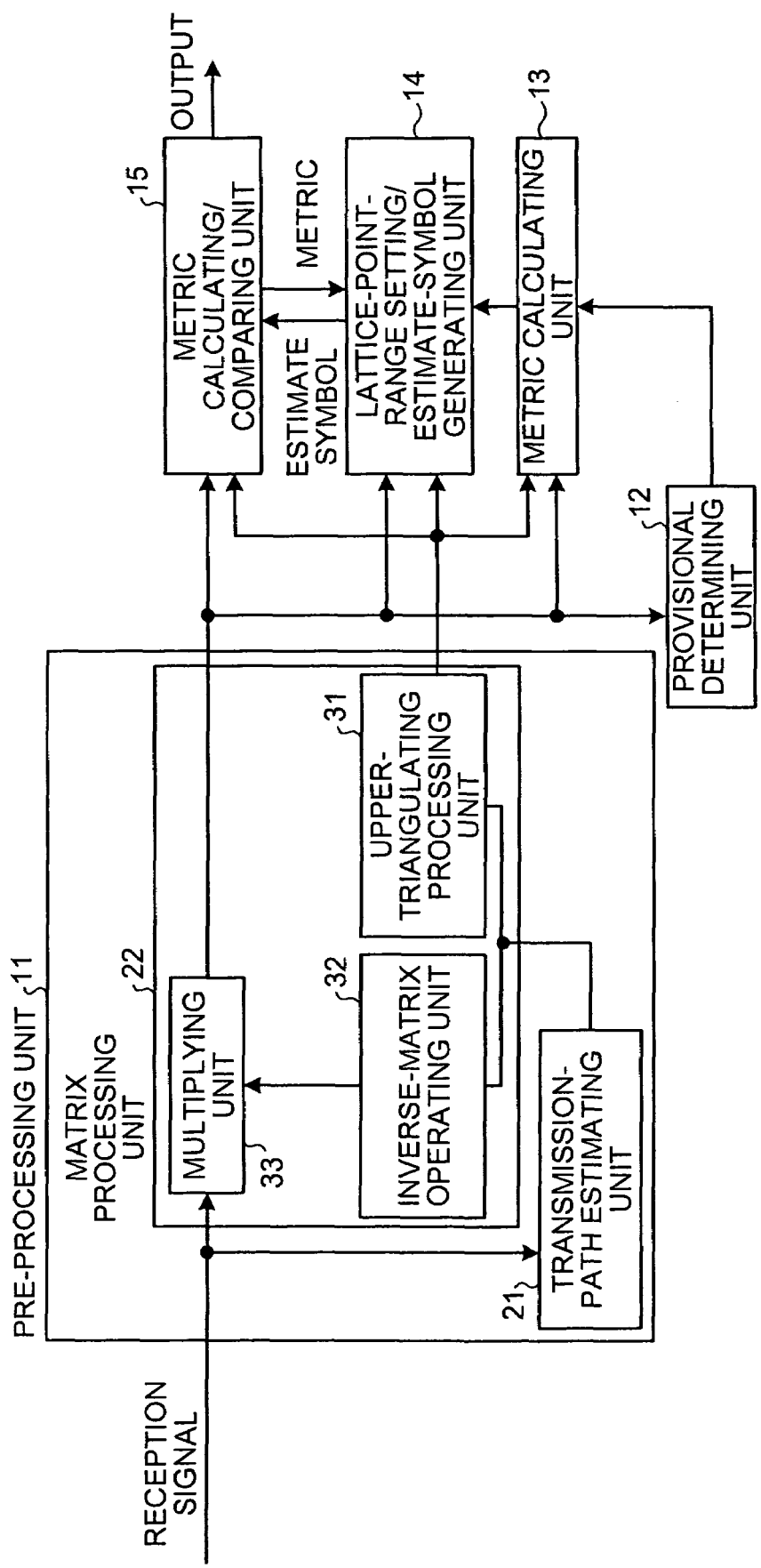
FIG. 2 is a configuration diagram of a maximum-likelihood-determination processing unit according to a first embodiment.

FIG. 2 is a configuration diagram of the maximum-likelihood-determination processing unit 4 according to a first embodiment. The maximum-likelihood-determination processing unit 4 includes a pre-processing unit 11 having a transmission-path estimating unit 21 and a matrix processing unit 22, a provisional determining unit 12, a metric calculating unit 13, a lattice-point-range setting/estimate-symbol generating unit 14, and a metric calculating/comparing unit 15. The matrix processing unit 22 within the pre-processing unit 11 includes an upper-triangulating processing unit 31, an inverse-matrix operating unit 32, and a multiplying unit 33.

An outline of the operation performed by the receiving apparatus according to the present invention is explained below. First, N (where N is an integer of 1 or more) antennas 1-1 to 1-N receive high-frequency analog signals. The analog processing units 2-1 to 2-N that are connected to these antennas down-convert the received high-frequency analog signals into baseband signals. Thereafter, the A/D converting units 3-1 to 3-N convert the baseband signals into digital signals, and output the A/D-converted digital signals to the maximum-likelihood-determination processing unit 4. The maximum-likelihood-determination processing unit 4 executes the maximum likelihood determination process according to the present embodiment described later.

An operation performed by the maximum-likelihood-determination processing unit 4 as the feature of the present invention is explained in detail below. First, the pre-processing unit 11 executes preprocess of the maximum likelihood determination process, based on the reception signal after the conversion to the digital signal (hereinafter, the term reception signal refers to the reception signal having been converted into the digital signal). The transmission-path estimating unit 21 estimates a transmission-path response matrix from the reception signal, and outputs a result of the estimation to the matrix processing unit 22. The transmission-path response matrix is estimated by transmitting known pilot signals from both transmitter and receiver sides. The matrix processing unit 22 calculates an inverse matrix of the transmission-path response matrix received by the inverse-matrix operating unit 32, and outputs a result of the calculation to the multiplying unit 33. The upper-triangulating processing unit 31 decomposes the received transmission-path response matrix into an upper triangular matrix, using a mathematically well-known method such as a QR analysis and Cholesky decomposition. The multiplying unit 33 multiplies the reception signal by the inverse matrix of the transmission-path response matrix.

The pre-processing unit 11 notifies a result of the calculation by the multiplying unit 33 (a result of multiplying the reception signal by the inverse matrix of the transmission path response), to the provisional determining unit 12, the metric calculating unit 13, the lattice-point-range setting/estimate-symbol generating unit 14, and the metric calculating/comparing unit 15. The pre-processing unit 11 also outputs a result of the process carried out by the upper-triangulating processing unit 31 (the transmission-path response matrix that is decomposed into the upper triangular matrix), to the metric calculating unit 13, the lattice-point-range setting/estimate-symbol generating unit 14, and the metric calculating/comparing unit 15.

The provisional determining unit 12 makes a provisional determination of a transmission signal based on the received result of the calculation by the multiplying unit 33, and outputs a result of the provisional determination to the metric calculating unit 13. The metric calculating unit 13 calculates a metric of the reception signal and the result of the provisional determination, based on the result of the calculation by the multiplying unit 33, the result of the process carried out by the upper-triangulating processing unit 31, and the result of the provisional determination received from the provisional determining unit 12. The metric calculating unit 13 outputs the calculation result to the lattice-point-range setting/estimate-symbol generating unit 14.

Figure 3:
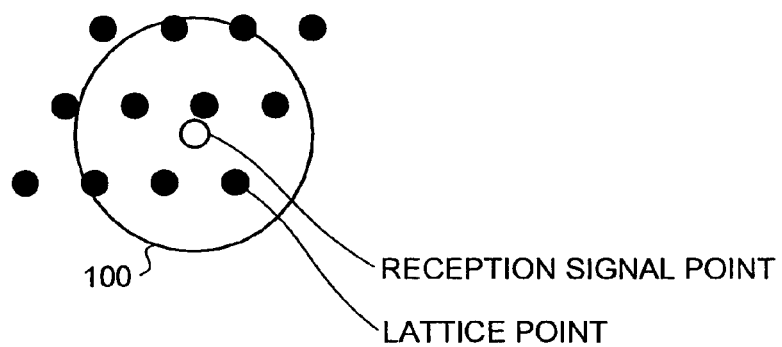
FIG. 3 depicts lattice points that are present within a specific hypersphere.

The lattice-point-range setting/estimate-symbol generating unit 14 forms a hypersphere having a specific radius around the reception signal point, in a lattice point space generated based on the candidate of the transmission signal and the transmission-path response matrix. The lattice-point-range setting/estimate-symbol generating unit 14 determines lattice points that are present within the hypersphere. FIG. 3 depicts the lattice points that are present within a specific hypersphere. In FIG. 3, a reference numeral 100 represents a hypersphere that is formed. The lattice-point-range setting/estimate-symbol generating unit 14 outputs one of the lattice points that are determined to be present in the hypersphere 100, to the metric calculating/comparing unit 15, as an estimate symbol. In a first process, a radius that is used by the lattice-point-range setting/estimate-symbol generating unit 14 is set based on the metric notified from the metric calculating unit 13. In second and subsequent processes, the radius is set based on the metric notified from the metric calculating/comparing unit 15.

The metric calculating/comparing unit 15 receives the estimate symbol from the lattice-point-range setting/estimate-symbol generating unit 14, and calculates a metric of the reception signal and the estimate symbol. Specifically, the metric calculating/comparing unit 15 stores a minimum metric calculated in the past and the estimate symbol at that time. Each time when a new metric is calculated, the metric calculating/comparing unit 15 compares the metric stored at present with the metric calculated this time. When the newly calculated metric is minimum, the metric calculating/comparing unit 15 updates the stored information to information corresponding to the new metric. The metric calculating/comparing unit 15 outputs the minimum metric to the lattice-point-range setting/estimate-symbol generating unit 14.

Thereafter, the lattice-point-range setting/estimate-symbol generating unit 14 updates the radius of the hypersphere based on the newly calculated minimum metric, determines lattice points that are present within the hypersphere again, and notifies one point of the lattice points to the metric calculating/comparing unit 15 as an estimate symbol. The lattice-point-range setting/estimate-symbol generating unit 14 repeats the update process until when it is determined that no lattice point is present within the hypersphere. The metric calculating/comparing unit 15 outputs an estimate symbol that finally corresponds to the minimum metric, as a maximum-likelihood-determination value.

As described above, according to the present embodiment, a point of starting the maximum likelihood determination process is determined based on a result of the provisional determination by the provisional determining unit 12. Therefore, the metric calculation can be carried out at a lattice point nearer to the maximum likelihood determination symbol. Accordingly, the number of times of metric calculation can be decreased. Consequently, for example, even in the environment of a small signal-to-noise power ratio, the amount of operation can be substantially decreased. The method of provisionally determining a transmission signal from a reception signal is not limited to the above process of using "a result of multiplying the reception signal by the inverse matrix of the transmission-path response matrix", and other methods can be also used.

Second Embodiment

Figure 4:
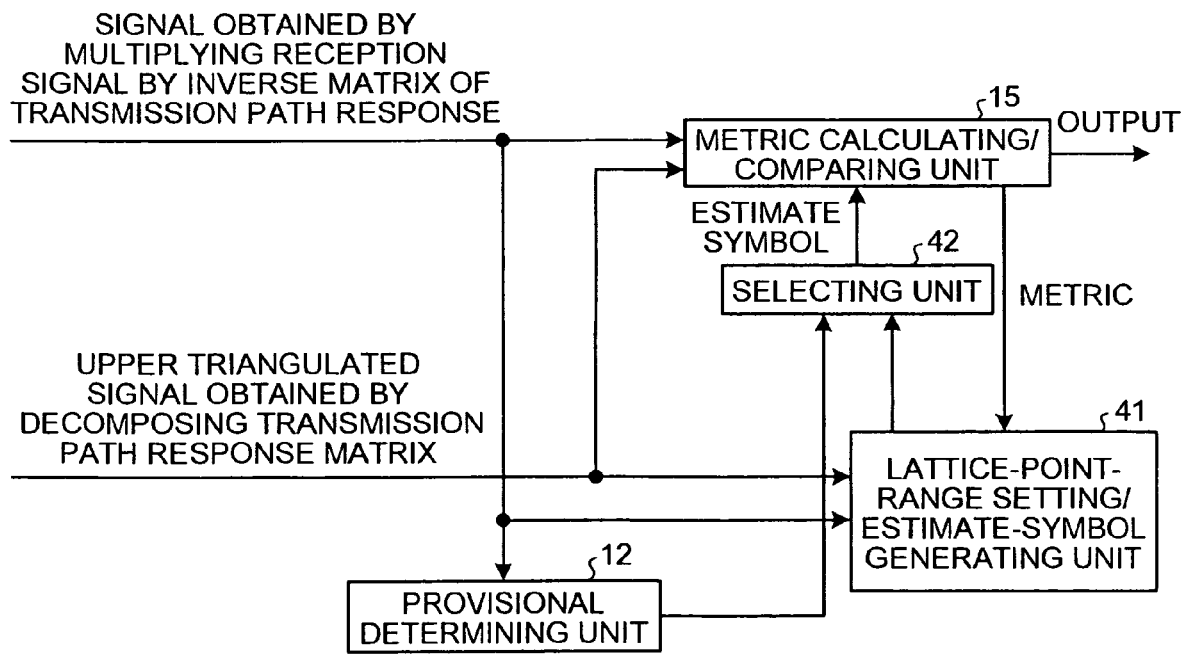
FIG. 4 is a configuration diagram of a maximum-likelihood-determination processing unit according to a second embodiment.

FIG. 4 is a configuration diagram of the maximum-likelihood-determination processing unit 4 shown in FIG. 1 according to a second embodiment. The maximum-likelihood-determination processing unit 4 includes a lattice-point-range setting/estimate-symbol generating unit 41, and a selecting unit 42. A total configuration of a receiving apparatus is similar to that shown in FIG. 1 explained above. As for constituent elements of the maximum-likelihood-determination processing unit 4, like reference numerals denote like parts shown in FIG. 2, and their explanation is omitted. In the present embodiment, only the process that is different from the process according to the first embodiment is explained.

An operation performed by the maximum-likelihood-determination processing unit 4 according to the second embodiment is explained in detail below. In the second embodiment, a result of the calculation by the multiplying unit 33 (a result of multiplying the reception signal by an inverse matrix of the transmission path response) is output, as a result of the process carried out by the pre-processing unit 11, to the provisional determining unit 12, the lattice-point-range setting/estimate-symbol generating unit 41, and the metric calculating/comparing unit 15. A result of the process carried out by the upper-triangulating processing unit 31 (a transmission-path response matrix decomposed into the upper triangular matrix) is output to the lattice-point-range setting/estimate-symbol generating unit 41, and the metric calculating/comparing unit 15. A result of a transmission signal provisionally determined by the provisional determining unit 12 is output to the selecting unit 42.

The selecting unit 42 has a function of switching an input signal. In a first process, the selecting unit 42 selects a result of a transmission signal provisionally determined by the provisional determining unit 12, and outputs the selected result, as an estimate symbol, to the metric calculating/comparing unit 15. The metric calculating/comparing unit 15 calculates a metric of the reception signal and the estimate symbol, based on a result of the calculation by the multiplying unit 33, a result of the process carried out by the upper-triangulating processing unit 31, and an estimate symbol.

The lattice-point-range setting/estimate-symbol generating unit 41 sets a radius of a hypersphere based on the metric received from the metric calculating/comparing unit 15, and outputs one of lattice points that are present within the hypersphere, to the selecting unit 42, as an estimate symbol. In second and subsequent processes, the selecting unit 42 outputs a result of the process carried out by the lattice-point-range setting/estimate-symbol generating unit 41, as the estimate symbol, to the metric calculating/comparing unit 15. Thereafter, the metric calculating/comparing unit 15 repeats the update process until when the lattice-point-range setting/estimate-symbol generating unit 41 determines that no lattice point is present within the hypersphere. The metric calculating/comparing unit 15 outputs an estimate symbol that finally corresponds to the minimum metric, as a maximum-likelihood-determination value.

As described above, according to the present embodiment, an effect similar to that obtained in the first embodiment can be obtained in a simpler configuration.

Third Embodiment

Figure 5:
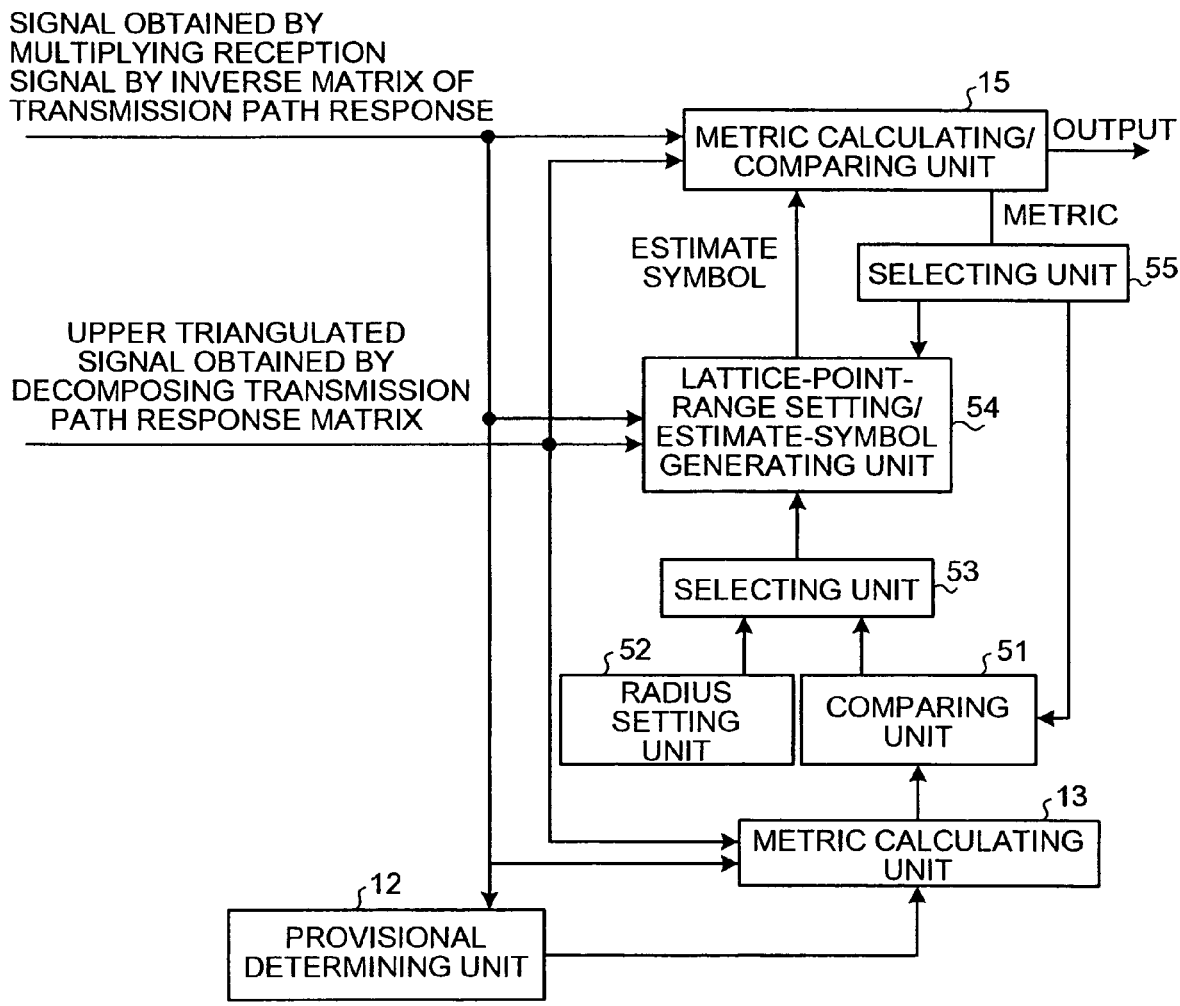
FIG. 5 is a configuration diagram of a maximum-likelihood-determination processing unit according to a third embodiment.

FIG. 5 is a configuration diagram of the maximum-likelihood-determination processing unit 4 shown in FIG. 1 according to a third embodiment. The maximum-likelihood-determination processing unit 4 includes a comparing unit 51, a radius setting unit 52, a selecting unit 53, a lattice-point-range setting/estimate-symbol generating unit 54, and a selecting unit 55. A total configuration of a receiving apparatus is similar to that shown in FIG. 1 explained above. As for constituent elements of the maximum-likelihood-determination processing unit 4, like reference numerals denote like parts shown in FIG. 2 and FIG. 4, and their explanation is omitted. In the present embodiment, only the process that is different from the process according to the first or the second embodiment is explained.

An operation performed by the maximum-likelihood-determination processing unit 4 according to the third embodiment is explained in detail below. In the third embodiment, a result of the calculation by the multiplying unit 33 (a result of multiplying the reception signal by an inverse matrix of the transmission path response) is output, as a result of the process carried out by the pre-processing unit 11, to the provisional determining unit 12, the metric calculating unit 13, the lattice-point-range setting/estimate-symbol generating unit 54, and the metric calculating/comparing unit 15. A result of the process carried out by the upper-triangulating processing unit 31 (a transmission-path response matrix decomposed into the upper triangular matrix) is output to the metric calculating unit 13, the lattice-point-range setting/estimate-symbol generating unit 54, and the metric calculating/comparing unit 15. A result of the calculation by the metric calculating unit 13 is output to the comparing unit 51.

In the first process, the comparing unit 51 outputs a metric from the metric calculating unit 13 to the selecting unit 53. In the second and subsequent processes, the comparing unit 51 compares a size of the metric from the metric calculating unit 13 with a size of the metric from the selecting unit 55, and outputs a smaller metric to the selecting unit 53.

The radius setting unit 52 outputs a value set in advance, as a radius. A set value of the radius can be determined according to, for example, dispersion of noise. Alternatively, a fixed value can be set as a radius. In the first process, the selecting unit 53 outputs a radius set by the radius setting unit 52, to the lattice-point-range setting/estimate-symbol generating unit 54. In the second and subsequent processes, the selecting unit 53 outputs a metric from the comparing unit 51 to the lattice-point-range setting/estimate-symbol generating unit 54.

The lattice-point-range setting/estimate-symbol generating unit 54 determines lattice points that are present within the hypersphere, based on a result of the selection carried out by the selecting unit 53, a result of the process carried out by the multiplying unit 33, and a result of the calculation by the upper-triangulating processing unit 31, and outputs one of the determined lattice points, as an estimate symbol, to the metric calculating/comparing unit 15. The metric calculating/comparing unit 15 calculates a metric of a reception signal and the estimate symbol, based on a result of the calculation by the multiplying unit 33, a result of the process carried out by the upper-triangulating processing unit 31, and the estimate symbol, similarly to the first embodiment.

The selecting unit 55 has a function of switching a transmission destination of the metric calculated by the metric calculating/comparing unit 15. In the first process, the selecting unit 55 switches a signal path to the comparing unit 51. In the second and subsequent processes, the selecting unit 55 switches the signal path to the lattice-point-range setting/estimate-symbol generating unit 54.

Thereafter, the metric calculating/comparing unit 15 repeats the update process until when the lattice-point-range setting/estimate-symbol generating unit 54 determines that no lattice point is present within the hypersphere. The metric calculating/comparing unit 15 outputs an estimate symbol that finally corresponds to the minimum metric, as a maximum-likelihood-determination value.

As described above, according to the present embodiment, a lattice point for starting a determination process is determined based on both the signal from the radius setting unit 52 and the result of the provisional determination by the provisional determining unit 12. Therefore, flexible process according to the communication environment is possible, and a large effect of reduction in the amount of operation can be obtained without depending on the signal-to-noise power ratio. The configuration shown in FIG. 5 is used as an example to execute the process according to the present embodiment, and a radius setting standard and the like of the radius setting unit 52 is not limited to that shown in FIG. 5.

Fourth Embodiment

Figure 6:
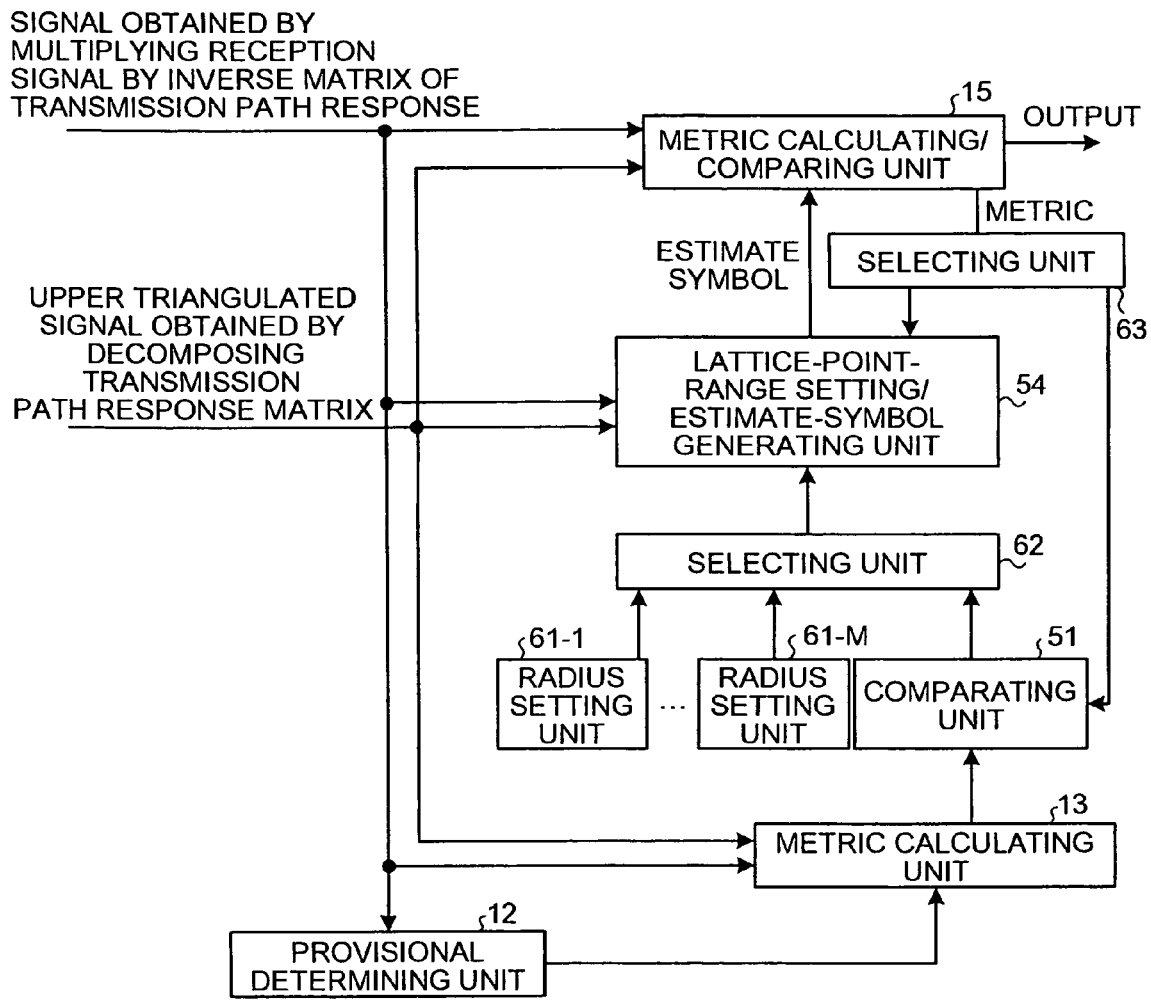
FIG. 6 is a configuration diagram of a maximum-likelihood-determination processing unit according to a fourth embodiment.

FIG. 6 is a configuration diagram of the maximum-likelihood-determination processing unit 4 shown in FIG. 1 according to a fourth embodiment. The maximum-likelihood-determination processing unit 4 includes radius setting units 61-1 to 61-M, and selecting units 62 and 63. A total configuration of a receiving apparatus is similar to that shown in FIG. 1 explained above. As for constituent elements of the maximum-likelihood-determination processing unit 4, like reference numerals denote like parts shown in FIG. 2, FIG. 4, and FIG. 5, and their explanation is omitted. In the present embodiment, only the process that is different from the process according to the first, the second, or the third embodiment is explained.

An operation performed by the maximum-likelihood-determination processing unit 4 according to the fourth embodiment is explained in detail below. The radius setting units 61-1 to 61-M set radiuses using different standards. In other words, the radius setting units output mutually different radiuses. While each radius setting unit sequentially switches a radius to a settable value, the selecting unit 62 outputs a result of the selection to the lattice-point-range setting/estimate-symbol generating unit 54. After all the radius setting units finish switching the radius, the selecting unit 62 notifies a metric from the comparing unit 51 to the lattice-point-range setting/estimate-symbol generating unit 54. At this point of time, the comparing unit 51 outputs a minimum metric among metrics corresponding to estimate symbols generated based on a radius outputs from respective radius setting units, and metrics corresponding to symbols provisionally determined by the provisional determining unit 12.

The selecting unit 63 switches output destinations of calculated metrics. This switch operation is carried out as follows. When the number of radius setting units is M, the selecting unit 63 notifies the first M metrics to the comparing unit 51, and notifies the rest of the metrics to the lattice-point-range setting/estimate-symbol generating unit 54.

As explained above, according to the present embodiment, there are plural radius setting units, and a lattice point for starting a determination process is determined using various standards. Therefore, a radius can be set flexibly according to the communication environment, and thus, a large effect of reduction in the amount of operation can be constantly obtained. In the present embodiment, while signals of the plural radius setting units and a result of the provisional determination by the provisional determining unit 12 are used, other configurations can be also used. For example, the provisional determining unit 12 and the metric calculating unit 13 can be omitted, and the comparing unit 51 can compare only the metrics from the selecting unit 63.

INDUSTRIAL APPLICABILITY

As described above, a receiving apparatus according to the present invention is useful when a maximum-likelihood-determination method is used to determine reception data. Particularly, the invention is suitable for a receiving apparatus that is used in a communication environment in which a signal-to-noise power ratio varies.

The invention claimed is:

1. A receiving apparatus that uses a maximum-likelihood-determination method as a method of determining reception data, and executes a determination process using an analog-to-digital-converted reception signal, the receiving apparatus comprising:

a transmission-path estimating unit that estimates a transmission-path response matrix of a radio transmission path based on the reception signal;

a matrix processing unit that decomposes the transmission-path response matrix into an upper triangular matrix, and multiplies the reception signal by an inverse matrix of the transmission-path response matrix;

a provisional determining unit that provisionally determines a transmission signal based on a result of multiplication of the reception signal by the inverse matrix of the transmission-path response matrix;

a metric calculating unit that calculates a metric based on a result of the provisional determination, the decomposed transmission-path response matrix, and the result of the multiplication;

a comparing unit that compares a metric obtained as a result of the calculation by the metric calculating unit with an updated metric, and outputs a smaller metric;

an estimate-symbol determining unit that forms a hypersphere centering around a reception signal point based on a specific value representing a radius of the hypersphere or the updated metric, from a result of comparison by the comparing unit, generates a candidate of an estimate symbol based on the decomposed transmission-path response matrix and the result of the multiplication, and determines whether the candidate of the estimate symbol is present within the hypersphere; and a metric updating unit that calculates a metric based on the candidate of the estimate symbol obtained as a result of the determination by the estimate-symbol determining unit and the result of the multiplication, stores a minimum metric from among metrics calculated in the past and the candidate of the estimate symbol corresponding to the minimum metric, compares a newly calculated metric with a currently stored metric every time when the metric is newly calculated, and updates stored information when the newly calculated metric is smaller than the currently stored metric, wherein the metric updating unit repeats the update process until the estimate-symbol determining unit determines that no candidate of the estimate symbol is present within the hypersphere, and sets the candidate of the estimate symbol that corresponds to a final minimum metric as a maximum-likelihood-determination value.

2. The receiving apparatus according to claim 1, wherein the estimate-symbol determining unit forms the hypersphere centering around the reception signal point based on the specific value representing a radius of the hypersphere for a first process, forms the hypersphere centering around the reception signal point based on the result of the comparison for a second process, and forms the hypersphere centering around the reception signal point based on the updated metric for a subsequent process.

3. The receiving apparatus according to claim 1, wherein when M kinds of the specific values that are set based on mutually different standards are sequentially input, where M is a positive integer greater than one, the estimate-symbol determining unit forms the hypersphere centering around the reception signal point based on the input specific values for a first to M-th processes, forms the hypersphere centering around the reception signal point based on the result of the comparison for (M+1)-th process, and forms the hypersphere centering around the reception signal point based on the updated metric for a subsequent process.

* * * * *